United States Patent [19]

Wood

[11] 4,347,958
[45] Sep. 7, 1982

[54] APPARATUS FOR CUTTING GLASS

[76] Inventor: Donald C. Wood, Rte. 3, Box 332, Sylva, N.C. 28779

[21] Appl. No.: 205,686

[22] Filed: Nov. 10, 1980

[51] Int. Cl.$^3$ .................... C03B 33/04; C03B 33/10
[52] U.S. Cl. ........................................ 225/96.5; 225/2
[58] Field of Search ................................. 225/96.5, 2

[56] References Cited

U.S. PATENT DOCUMENTS

| | | | |
|---|---|---|---|
| 1,123,336 | 1/1915 | Madden | 225/96.5 |
| 2,044,577 | 6/1936 | Klages | 225/96.5 |
| 2,219,698 | 10/1940 | Owen | 225/96.5 X |
| 2,302,174 | 11/1942 | Boicey et al. | |
| 2,507,841 | 5/1950 | Upton | 225/2 |
| 2,591,828 | 4/1952 | Judd, Jr. | |
| 2,774,188 | 12/1956 | Jordan, Jr. | 225/96.5 |
| 3,207,398 | 9/1965 | Forsström et al. | 225/96 |
| 3,520,457 | 7/1970 | Augustin et al. | 225/96.5 X |
| 3,532,260 | 10/1970 | Augustin et al. | 225/96.5 X |
| 3,718,268 | 2/1973 | Insolio | 225/96.5 X |
| 3,917,139 | 11/1975 | Kabanov et al. | 225/96.5 |
| 4,175,684 | 11/1979 | Butler | 225/2 |

Primary Examiner—Frank T. Yost

[57] ABSTRACT

This invention relates to a method and apparatus for cutting glass and particularly to a method and apparatus for cutting glass circles. By means of the invention, the score formed in the glass is caused to run through the glass, as the score is being made, so that the glass will be cut with a smooth edge and no additional treatment of the edge is necessary. The apparatus of the invention may consist of an attachment which may be applied to standard circle cutting machine.

4 Claims, 5 Drawing Figures

APPARATUS FOR CUTTING GLASS

In cutting glass, a score is made on the surface of the glass by means of a glass cutter and the glass is carefully broken away from the score, usually by means of a special pair of pliers designed for that purpose. However, when the excess glass is removed, the edge is usually left with a rough, sharp surface which needs to be smoothed down, depending on the use of the glass. This requires an extra step in the process which requires additional time and equipment.

It is a principal object of the invention to provide a method and an apparatus for cutting glass in which the score being made is caused to run through the glass as the score is being made.

Another object of the invention is to provide a method and an apparatus for cutting glass in which the scoring and smoothing operations are performed in one step.

Another object of the invention is to provide an apparatus for cutting glass in which a form having the contour of the glass to be cut is used to support the glass, the contour of the form being slightly displaced from the desired contour of the glass to be cut, a cutting tool is arranged to score the glass along the desired contour, and a member is provided to produce pressure against the glass at a point displaced slightly from the score being cut by the cutting tool and trailing it as the score is being made.

Another object of the invention is to provide an apparatus for cutting glass circles in which a single circular movement of a cutting tool will score a circle in the glass and at the same time flex the glass, so that the score, thus formed, will run through the glass and the circle of glass may be removed without the necessity of any additional operation on the edge of the glass.

Still another object of the invention is to provide an attachment for a standard circle glass cutter which will produce the effect noted in the paragraph above.

Other objects of the invention will be apparent as the description of the invention proceeds.

The invention is illustrated in the accompanying drawings, in which.

Figure 1:
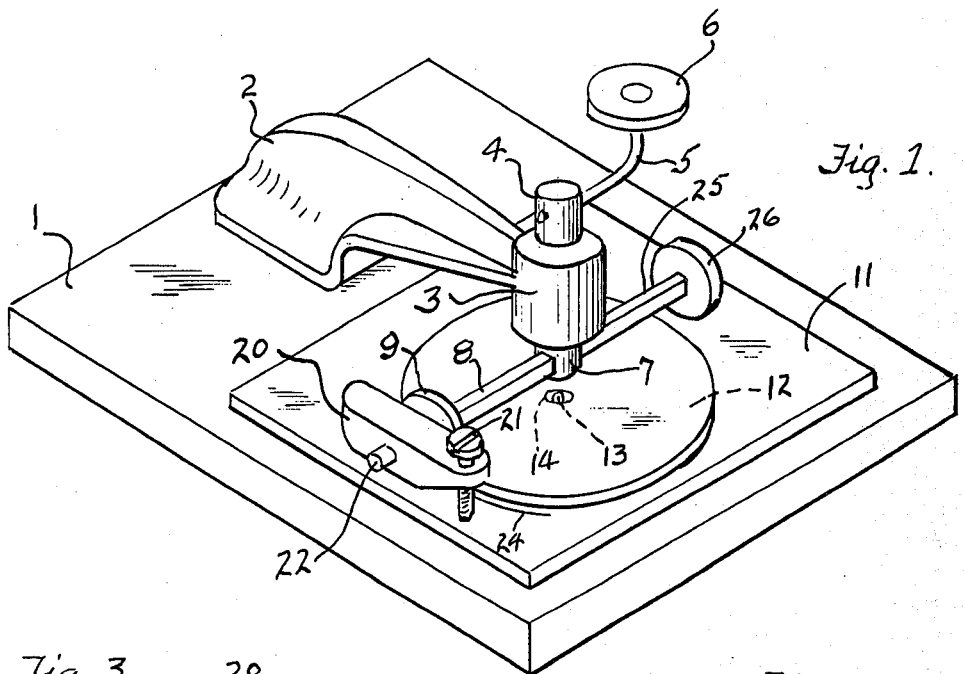
FIG. 1 is a perspective view of a standard glass cutter equipped with my attachment which accomplishes the objects of the invention.
Figure 3:
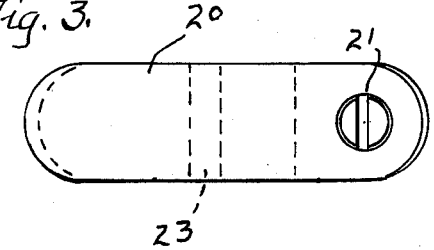
FIG. 3 is a plan view of the attachment shown in FIG. 2.
Figure 2:
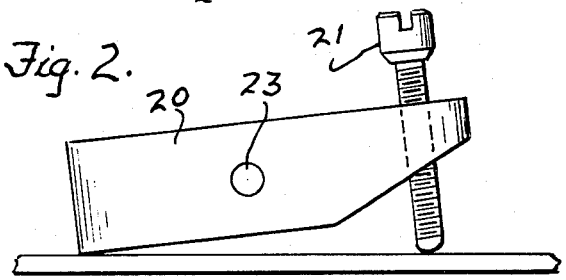
FIG. 2 is an elevational view of my attachment which may be applied to a standard glass circle cutting machine for accomplishing the desired results.

Referring now more specifically to the drawings, a standard machine for cutting glass circles is shown in FIG. 1 in perspective. The machine comprises a base 1 provided with a bracket 2 attached at one end of the base and extending upwardly and towards the other end of the base and spaced from the base to permit a sheet of glass (indicated at 11) to be placed on the base beneath the bracket. The forward end of the bracket 2 is provided with a bearing 3 in which is mounted on a vertical axis a spindle 4 which is axially movable in the bearing. The spindle 4 is provided with a crank 5 having a knob 6 by means of which the spindle may be rotated and downward pressure may be exerted upon it. The lower end of the spindle extends below the bearing 3 and is provided with an arm 8 extending at right angles thereto and at the the end of which is mounted a disc 9 carrying a glass cutting tool 10 (shown in FIG. 4). The distance from the axis of the spindle 4 to the cutting tool 10 will be equal to the radius of the circle being cut. This cutting tool 10 may be any of the well known devices used for this purpose. Normally several cutting tools are provided on the disc 9, so that the disc may be rotatably adjusted to use another cutting tool if the first one becomes worn.

As thus described, this machine represents a standard circle cutter. A sheet of glass 11 may be placed on the base 1, the knob 6 may be pressed down, moving the spindle 4 downwardly within the bearing 3 until the glass cutting tool 10 presses against the glass, and the spindle may then be rotated so that the glass is scored in a circle, the necessary pressure being supplied manually.

The invention introduces different features which have astonishing results. A form 12 is provided which has a diameter slightly less than that of the circle to be cut. This form may be made of glass or other hard material, such as hard rubber or plastic. It is preferable that it have a surface such that the glass to be cut will not slip on it. For this reason hard rubber may be preferred. Means are provided for locating the form with its center aligned with the axis of the spindle. For this purpose a pin 13 may be provided in the base, aligned with the axis of the spindle, and which will engage a hole 14 in the form 12, so that the form may be located similarly to the manner in which a phonograph record is centered on the rotating disc of the phonograph. Any other means of centering the form may be employed, as desired.

A member 20 which forms the attachment of my invention is mounted on the disc 9. I have shown this member as a rectangular piece of metal or other solid material extending at right angles to the arm 8. This member may be of any desired shape, as long as it extends to the rear of the cutting tool 10 as it moves around the glass to be cut. I have shown this member tapered at its rear end and provided with a screw 21 which is threaded through the tapered end of the member so that the end of the screw will bear against the glass to be cut. By means of this screw pressure is exerted on the glass as it is scored.

Any means of providing suitable pressure may be provided. I may prefer to mount the member 20 rotatably on the arm 8 by means of a shaft 22 which passes through a hole 23 in the member 20. By adjusting the screw 21 the forward end of the member 20 will also press against the glass while the screw itself will press against the glass at a point trailing the cutting tool. Any desired pressure of the screw against the glass in relation to the pressure of the cutting tool may thus be obtained.

Figure 4:
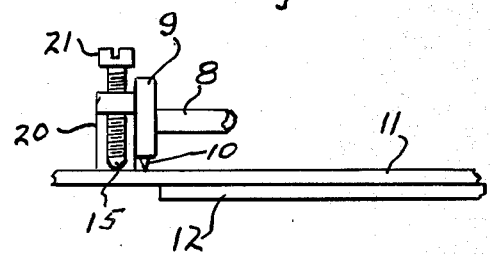
FIG. 4 is an end view of the cutting tool and attachment, showing the position of the cutting tool and the pressure element of the attachment on the glass being cut.

With the form 12 in position on the base 1, a sheet of glass 11 may be placed over the form. FIG. 4 shows the position of the cutting tool 10 with respect to the edge of the form 12. When the cutting tool 10 is pressed against the glass with the desired pressure to produce a score, the end of the screw 15 is also pressed against the glass. The diagram of FIG. 5 shows the positions of the cutting tool 10, the edge of the form 12, and the position of the screw 21.

When the arm 5 is rotated in a clockwise direction with the cutting tool 10 pressed with sufficient force against the glass 11, the score 24 will be cut in the glass. At the same time the screw 21 will press against the glass with sufficient force to flex the glass slightly over the edge of the form 12, with the result that the score will run through the glass as the score is made. When the cutting tool has completed 360 degrees, the excess may easily be removed, leaving a smooth circle of glass which does not need to be further processed. Additional radial scoring of the glass outwardly from the scored circle in order to facilitate removal of the excess glass may be accomplished as desired.

Figure 5:
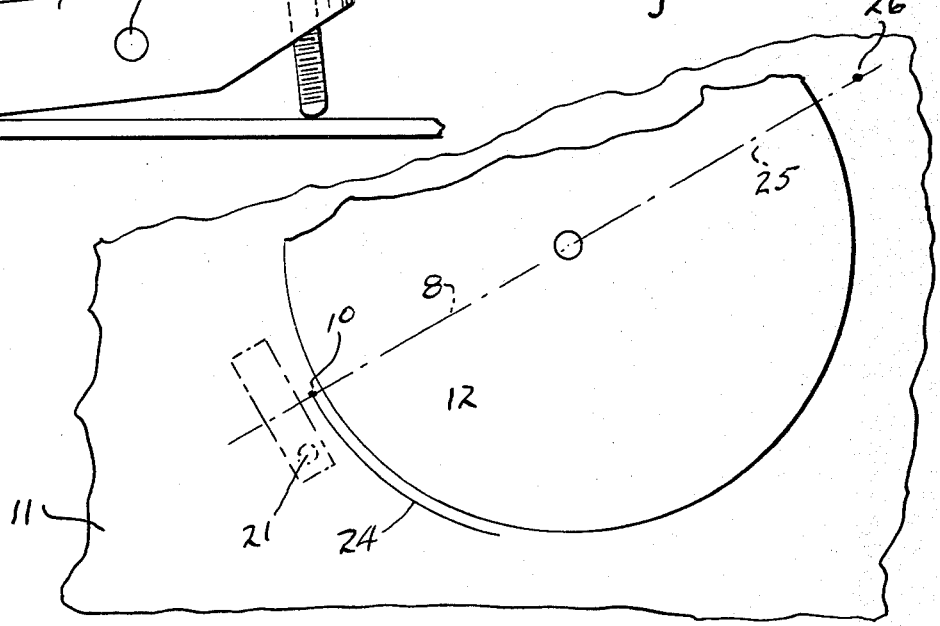
FIG. 5 is a diagrammatical view of the glass being cut showing the points at which the cutting tool, the pressure element of the attachment, and the counter-acting pressure device are acting on the glass.

The point where the pressure is applied to the glass is not critical, but I have found that the proportional distances indicated in FIG. 5 give excellent results.

When pressure is applied to the glass outside the edge of the form beneath the glass, there may be a tendency of the sheet of glass to tilt. In order to prevent this effect, I may provide another arm 25 extending substantially diametrically opposite to the arm 8 on the end of which I may provide a disc 26 which may be rotatably mounted on the arm 25 and which will exert a compensating pressure on the other side of the glass as the score is being made. FIG. 5 shows the position of the arm 25 and the point of pressure of the disc 26.

While the invention has been specifically described in connection with a glass circle cutter, it will be understood that glass may be cut with any desired curvature using the principle of the invention, ie: providing a form with the desired curvature, scoring the glass on a line slightly displaced from the edge of the form, and simultaneously applying pressure to the glass outside of the score and slightly trailing the cutting tool as the score is made. I do not therefore desire to limit my invention by the structure shown and described except by the limitations contained in the appended claims.

What I desire to claim and secure by Letters Patent is:

1. A glass cutter for cutting glass circles comprising a base, a flat circular form having a diameter slightly smaller than that of the circle to be cut, means for supporting said form on said base in a predetermined position, so that the glass to be cut may be placed on top of said form, a bracket extending over said form and the glass to be cut and rigidly secured to said base, a spindle rotatably mounted on said bracket on an axis perpendicular to the surface of said form and in alignment with the center of said form, an arm attached to said spindle and extending outwardly therefrom, a cutting tool attached to said arm at a point spaced from the axis of said spindle equal to the radius of the circle to be cut and extending downwardly towards the surface of the glass to be cut and perpendicular thereto, means for rotating said spindle with said cutting tool applied against the glass to be cut with sufficient force to score the glass, means attached to said cutting tool for applying pressure to the glass being scored at a point trailing said cutting tool and spaced slightly from said form, said last mentioned means comprising a shaft extending outwardly from said cutting tool, a member rotatably mounted on said shaft and extending perpendicularly to said shaft a short horizontal distance therefrom, and adjustable means on the trailing end of said member as said cutting tool moves for creating a pressure on the glass being scored as the other end of said member is pressed against the glass with an equalizing pressure, whereby the glass is flexed as the score is made and the score is caused to run through the glass.

2. A glass cutter for cutting glass circles, as defined in claim 1, further comprising means attached to the spindle extending substantially in the opposite direction from the arm carrying the cutting tool for applying pressure to the glass being cut at a point outside the edge of the form for substantially equalizing the pressure being applied to the glass by the pressure applying means attached to the cutting tool.

3. A glass cutter for cutting glass circles comprising a base, a flat circular form having a diameter slightly smaller than that of the circle to be cut, means for supporting said form on said base in a predetermined position, so that the glass to be cut may be placed on top of said form, a bracket extending over said form and the glass to be cut and rigidly secured to said base, a spindle rotatably mounted on said bracket on an axis perpendicular to the surface of said form and in alignment with the center of said form, an arm attached to said spindle and extending outwardly therefrom, a cutting tool attached to said arm at a point spaced from the axis of said spindle equal to the radius of the circle to be cut and extending downwardly towards the surface of the glass to be cut and perpendicular thereto, means for rotating said spindle with said cutting tool applied against the glass to be cut with sufficient force to score the glass, means attached to said cutting tool for applying pressure to the glass being scored at a point trailing said cutting tool and spaced slightly from said tool and further comprising means attached to said spindle extending substantially in the opposite direction from said arm for applying pressure to the glass being cut for substantially equalizing the pressure being applied to the glass by said means attached to said cutting tool, whereby the glass is flexed as the score is made and the score is caused to run through the glass.

4. An attachment for a circular glass cutter comprising a member, means for rotatably mounting said member spaced outwardly from the cutting tool with a portion of said member extending forwardly of said cutting tool and a portion extending rearwardly thereof as said cutting tool moves to score the glass being cut, and means on the trailing end of said member for applying a predetermined pressure against said glass at a point outside of the score being made by said cutting tool, whereby the forward end of said member is pressed with equalizing force against said glass.

* * * * *